United States Patent [19]

Hara

[11] Patent Number: 5,362,156

[45] Date of Patent: Nov. 8, 1994

[54] LINEAR MOTION GUIDE UNIT WITH ROLLING ELEMENTS

[75] Inventor: Takehiko Hara, Yokohama, Japan

[73] Assignee: Nippon Thompson Co., Ltd., Tokyo, Japan

[21] Appl. No.: 977,214

[22] Filed: Nov. 16, 1992

[30] Foreign Application Priority Data

Nov. 16, 1991 [JP] Japan .................... 3-326317

[51] Int. Cl.⁵ .............................. F16C 29/06
[52] U.S. Cl. ............................. 384/45; 384/49
[58] Field of Search ................... 384/43, 45, 49

[56] References Cited

U.S. PATENT DOCUMENTS

| | | | |
|---|---|---|---|
| 4,616,886 | 10/1986 | Teramachi | 384/45 |
| 4,692,038 | 9/1987 | Kasai | 384/45 |
| 4,854,741 | 8/1989 | Mottate et al. | 384/45 |

FOREIGN PATENT DOCUMENTS

| | | |
|---|---|---|
| 2574502 | 11/1985 | France . |
| 1158766 | 12/1959 | Germany . |
| 3134313 | 8/1981 | Germany . |
| 3442720 | 11/1984 | Germany . |
| 4041421 | 12/1990 | Germany . |
| 360938 | 3/1991 | Japan . |
| 423233 | 2/1992 | Japan . |
| 2139298 | 11/1984 | United Kingdom . |

*Primary Examiner*—Daniel P. Stodola
*Assistant Examiner*—John Q. Nguyen
*Attorney, Agent, or Firm*—Browdy and Neimark

[57] ABSTRACT

A linear motion rolling guide unit in which rolling elements of one side are in four-point contact with raceway surfaces of one of two raceways formed by raceway grooves in a rail and grooves in a casing and rolling elements of the other side are in two-point contact with raceway surfaces of the other raceways. Depending on the direction in which load is applied to the slider, the number of raceway surfaces the rolling elements contact is changed to allow machining errors of the raceway grooves and to give room of the machining accuracy so that even when the casing is applied with an uneven load the slider can slide smoothly on the track rail.

6 Claims, 5 Drawing Sheets

LINEAR MOTION GUIDE UNIT WITH ROLLING ELEMENTS

BACKGROUND OF THE INVENTION

1. Field of the Invention

The present invention relates to a linear motion rolling guide unit which is applied to sliding portions of machining tools, precision processing equipment and testing equipment and which consists of a track rail with raceway grooves formed longitudinally extending on both side walls thereof, a casing saddling the track rail and having raceway grooves, and a number of rolling elements that roll between the raceway grooves.

2. Description of the Prior Art

A conventional linear motion rolling guide unit is such that a relatively heavy equipment is mounted on a slider and the slider is moved forward and backward on track rails over a relatively long distance at high precision by the guide of a guide unit. A conventional linear motion rolling guide unit will be described referring to FIG. 12 and FIG. 13.

FIG. 12 is a perspective view of an example of the linear motion rolling guide unit. The linear motion rolling guide unit consists of two parallel track rails 2 secured to a bed 20, a plurality of sliders 1 saddling each of the track rails 2, and a slide table 4 secured to the sliders 1. Equipment placed on the slide table 4 is moved forward and backward in the directions indicated by arrow G. Each of the track rails 2 has raceway grooves 5 formed longitudinally extending on both side wall surfaces 21. The sliders 1 are mounted astride the track rails 2 so that they are slidable. Each slider 1 consists of a casing 3 which is slidable relative to the track rail 2 and has a raceway groove formed in position facing the raceway groove 5, a number of rolling elements like balls confined between the opposing raceway grooves to allow relative motion of the casing to the rail, and end caps 6 attached to the longitudinal ends of the casing 3, the longitudinal direction being the same as the sliding direction of the casing 3.

The sliders 1 are freely slidable on the track rails 2 because of the provision of the rolling elements that circulate along the raceway grooves 5 of the track rails 2. The rolling elements in a load region in each slider 1, traveling along the raceway groove 5 of the track rail 2, are led into a direction changing path described later which is formed in the end pap 6 and further moved into a return path formed parallel to the raceway groove in the upper part of the casing 3, so that the rolling elements circulate in an endless circulation path. By the rolling of the rolling elements under load between the raceway grooves of the sliders 1 and the raceway grooves 5 of the track rails 2, the sliders 1 can slide relative to the track rails 2.

In the guide unit shown in FIG. 12, the raceway grooves and the rolling elements engage with each other with no internal gap or in a preloaded condition because it is necessary to support radial and moment loads that acts through the sliders 1 in the vertical and lateral directions. Errors in parallelism, if any, of the two track rails 2 will result in an increase in the load during sliding motion, reduction in service life and variations in sliding resistance, thereby seriously affecting the precision and performance of the guide unit. Improving the precision of parallelism of the track rails 2 causes the number of assembly processes to increase. It is, however, very difficult to fix the track rails 2 in parallel with a high accuracy of less than several tens of micron over the entire length of several meters.

FIG. 13 is a sectional view showing the structure of a conventional linear motion rolling guide unit. The guide unit has a slide table 44 directly mounted astride the track rails 41, 42, with a large number of endlessly circulating bearings 46, 47 secured to the slide table 44. One of the track rails 41 is clamped by four bearings 46 from four directions to sustain the vertical and lateral loads while the other track rail 42 is clamped by two bearings 47 from above and under so that errors of parallelism between the track rails 41, 42 can be absorbed by the two bearings 47 slightly moving on the upper and lower raceway surfaces of the rail 42 in the directions indicated by arrow N. In such a structure, a number of endlessly circulating bearings 46, 47 each having a relatively large height are secured to the slide table 44. Then many lubricating oil passages 43 must be formed in the slide table 44, making the structure complex and large and therefore expensive. Not only does this make the unit unsuitable for applications to relatively small equipment but also makes it impossible to use the existing linear motion rolling guide units and track rails.

A linear motion guide unit similar to the above guide unit of FIG. 13 is disclosed in Japanese Patent Laid-Open No. 60938/1991. In the linear motion guide unit, one of the paired, parallel linear rails is made up of a vertical support section and a horizontal guide section. One side of a movable member guided along the two linear rails, is supported slidably on the linear rail in such a way that its lateral movement is restrained by the other linear rail. The other side of the movable member is supported slidably on the one linear rail in such a manner that it is restrained by the horizontal guide section of the linear rail from moving in vertical directions but is movable in horizontal directions. That is, when the parallelism of the paired linear rails cannot be ensured, the linear motion guide unit allows the second side of the movable member to be moved laterally relative to the first linear rail through a slider, thus making the assembly of the rails easy. To describe in more detail, the linear motion guide unit has a first linear rail and a second linear rail formed along a reference surface projectingly provided from the support bed, and the second linear rail consists of a vertical support section and a horizontal support section. One side of the movable member guided along these linear motion rails is slidably supported on the first linear rail through a first slider in such a way that its lateral motion is restricted by the first linear rail. The other side of the movable member is slidably supported on the horizontal guide section of the second linear rail through a second slider in such a way that it is restricted from moving in the vertical directions by the horizontal guide section of the second linear rail but is allowed to move in the horizontal directions.

A linear motion rolling guide unit that solves the problems of the conventional linear motion rolling guide unit is disclosed in Japanese Utility Model Laid-Open No. 23233/1992. This guide unit consists of track rails and sliders mounted astride the rails, the sliders having rolling elements and raceways for the rolling elements. Each slider consists of a lower member and an upper member. The lower member has the rolling elements and a raceway and is movably engaged with the track rail. The upper member is for fixing the table and is mounted on the lower member with a gap for allowing a limited motion in a direction perpendicular to the longitudinal direction of the track rail. The limited motion gap is formed either between the rolling elements—which are provided between the upper member and the lower member—and the front and rear ends of the raceway formed between the two members, or between side plates secured to the sides of the lower member for preventing the upper member from coming off and the side walls of the upper member.

Even when there is an error of several tens of microns in parallelism between the track rail of the reference and an accompanying track rail laid parallel to it, it is possible to maintain a high precision operation performance and a high rigidity at all times without increasing the load of the sliders-which are mounted astride the track rails and slide connected with a single slide table and without causing variations in the sliding resistance, by constructing the guide unit on the accompanying track rail side as mentioned above. This facilitates the work of fixing the accompanying track rail which is assembled parallel to the reference track rail. This makes it possible not only to form the guide unit relatively compact but maintain as high a rigidity of the saddle structure of the track rails and sliders as those of conventional units. Furthermore, this guide unit also permits the use of the existing products of both track rails sliders mounted on the reference track rail.

In conventional linear motion rolling guide units, a large number of rolling elements that rotate in two rows on a single track rail each are in two-point contact with the wall surface of a raceway—which is formed by a raceway groove in each longitudinally extending side wall of the track rail and by a raceway groove in the casing. As a whole the rolling elements are supported by four-point contact.

The linear motion rolling guide unit, however, has the following drawbacks. Since the rolling elements are in four-point contact with the raceway, the raceway grooves must be machined to a high accuracy so that each of the rolling elements is in two-point contact with the two wall surfaces or raceway surfaces of the raceway groove formed in the track rail and at the same time with the two wall surfaces or raceway surfaces of the raceway groove formed in the casing. Another disadvantage is that when the guide unit slides on the track rails with the casing applied with an imbalance load, the sliders cannot slide smoothly on the track rails.

SUMMARY OF THE INVENTION

The object of this invention therefore is to solve the above-mentioned problems. It is an object of the invention to provide a linear motion rolling guide unit whose rolling elements are rotated in raceways which are formed by raceway grooves in the casing and raceway grooves in the track rails, in which the rolling elements are in four-point contact with the raceway surfaces of one of the two raceways formed both in the facing sides of the casing and in the track rail so that this raceway constitutes a reference for the sliding motion, and further the rolling elements are in two-point contact with the raceway surfaces of the second raceway, and in which the number of raceway surfaces the rolling elements contact is changed according to the direction in which load acts on the slider to allow some degree of machining error and thereby the machining precision of the raceway surfaces are given some room so that even when the casing is applied with an imbalance load, the slider can slide smoothly on the track rail.

Another object of this invention is to provide a linear motion rolling guide unit which consists of a track rail having rail raceway grooves formed on each of the longitudinally extending side walls thereof, a casing which saddles the track rail and can be moved relative to the track rail and which has casing raceway grooves formed in positions facing the rail raceway grooves, a number of rolling elements that turn in raceways formed by the rail raceway grooves and the casing raceway grooves to allow the rail and the casing to move relative to each other, and end caps attached to the longitudinal ends of the casing, and the linear motion rolling guide unit being characterized in that the rolling elements moving in one of the two raceways are in two-point contact with the rail raceway groove and with the casing raceway groove and the rolling elements moving in the second raceway are in one-point contact with the rail raceway groove and with the casing raceway groove.

In this linear motion rolling guide unit, therefore, since the rolling elements in one of the raceways are in four-point contact, this structure can ensure a high rigidity and therefore the rolling elements can be a precision reference. In the second raceway the rolling elements are in two-point contact, which absorbs displacement due to the bending moment thereby giving room of the machining precision of the raceway grooves. This makes it possible to absorb parallelism and setting errors of the two track rails and also machining errors of the raceway grooves. This structure prevents the prepressure to the sliders conventionally exerted by machining and setting errors, thus making it possible for the slider to slide smoothly on the track rail and permitting a significant improvement of the machining precision. By contacting the rolling elements in the reference raceway with the raceway grooves at four points, the slider can maintain a specified precision and effectively receive an load in the direction where the imbalance load is exerted on the slider the most.

Therefore, when equipment mounted on the slide table secured to the sliders is slid on the parallel track rails, the precision of the reference side of the slider can be set high. That is, if the accompanying or second rail has an error of the order of several tens of microns in parallelism with respect to the reference rail, the slider saddling the reference track rail can be set in a position within the allowable error range. As a result, there is no increase in the sliding resistance between the track rail and the slider which would occur where the rails are not strictly parallel. Since the parallel alignment error of the rails is absorbed by the rolling elements on the two-point contact side moving in the raceway groove, no change will occur in the load on the slider and sliding resistance.

In one embodiment of the linear motion rolling guide unit, the casings are slidably mounted astride each of the parallel track rails and a slide table is securely mounted on the casings. In the two inner raceways the rolling elements are in four-point contact, and in the two outer raceways they are in two-point contact.

In the guide unit where in the outer raceways the rolling elements contact the lower raceway surface of the rail raceway groove and the upper raceway surface of the casing raceway groove, the two inner raceways serves as a reference of the sliding motion, thus allowing the slider to move slightly outwardly perpendicular to the sliding direction of the slide table to absorb the machining error. This is called a center adjustment function. The amount of this adjustment is small considering the moment of load acting on the slide table because the rolling elements contact the upper raceway surface of the outer casing raceway groove.

In the guide unit where in the outer raceways the rolling elements contact the upper raceway surface of the rail raceway groove and the lower raceway surface of the casing raceway groove, the two inner raceways serves as a reference of the sliding motion, thus allowing the slider to move slightly outwardly perpendicular to the sliding direction of the slide table to absorb the machining error. This is called a center adjustment function. The amount of this adjustment is large considering the moment of load acting on the slide table because the rolling elements contact the lower raceway surface of the outer casing raceway groove.

In another embodiment of the linear motion rolling guide unit, the casings are slidably mounted astride each of the parallel track rails and a slide table is securely mounted on the casings. In one of the two inner raceways the rolling elements are in four-point contact, and in the other inner raceway they are in two-point contact. In one of the two outer raceways the rolling elements are in two-point contact, and in the other outer raceway they are in four-point contact.

Where the two-point contact is achieved by the rolling elements contacting the lower raceway surface of the casing raceway groove and the upper raceway surface of the rail raceway groove, the raceways on the four-point contact side are the reference of the sliding motion, allowing the adjustment of the parallel alignment error or setting error of the track rails. The degree of adjustment is such that the rigidity of the unit is small with respect to an external force from the two-point contact side and large to a force from the four-point contact side. The two raceways on the four-point contact side are the reference of the sliding motion and the other two raceways allow the slider to move slightly toward the two-point contact side in a direction perpendicular to the sliding direction of the slide table, thus absorbing and adjusting the machining errors. The amount of this adjustment is large considering the moment of load acting on the slide table because the rolling elements contact the lower raceway surface of the outer casing raceway groove.

In the guide unit where the two-point contact is achieved by the rolling element contacting the upper raceway surface of the casing raceway groove and the lower raceway surface of the rail raceway groove, the raceway on the right-hand side in the figure of the track rail serves as the reference for the sliding motion, allowing the correction of the parallel alignment error or setting error of the track rails. The amount of adjustment is such that the rigidity of the unit is small against an external force from the two-point contact side and large against a force from the four-point contact side. The raceway on the right side or on the four-point contact side serves as the reference of the sliding motion and the other raceway allows the slider to move slightly toward the two-point contact side in a direction perpendicular to the direction of the slide of the slide table, thus absorbing and adjusting the machining error. The amount of this adjustment is small considering the moment of load acting on the slide table because the rolling elements contact the upper raceway surface of the outer casing raceway groove.

DETAILED DESCRIPTION OF EMBODIMENTS

Figure 1:
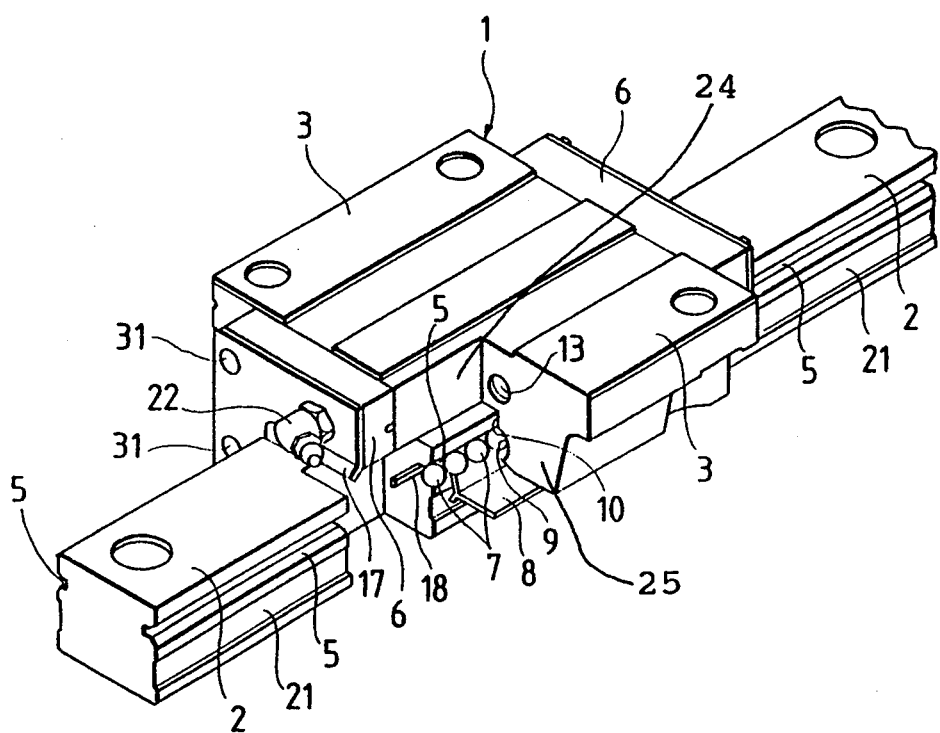
FIG. 1 is a partly cutaway perspective view showing the relationship between the slider and the track rail, to which the linear motion rolling guide unit of this invention can be applied.
Figure 2:
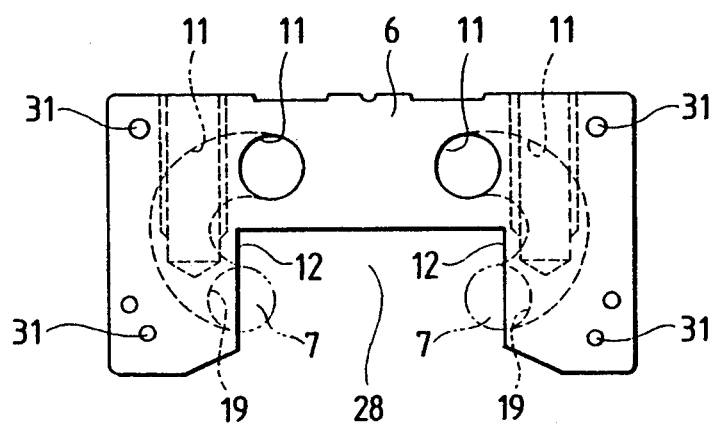
FIG. 2 is a front view of the end cap of the linear motion rolling guide unit of FIG. 1.
Figure 12:
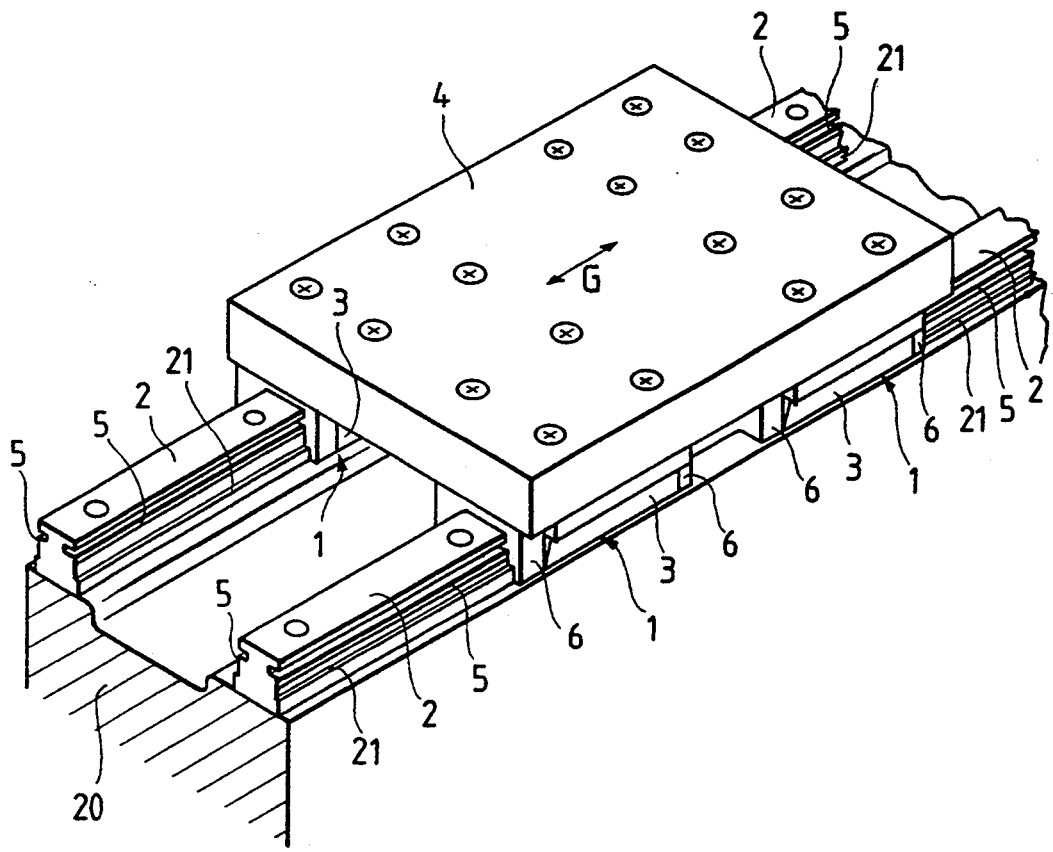
FIG. 12 is a perspective view of an example of conventional linear motion rolling guide units.
Figure 13:
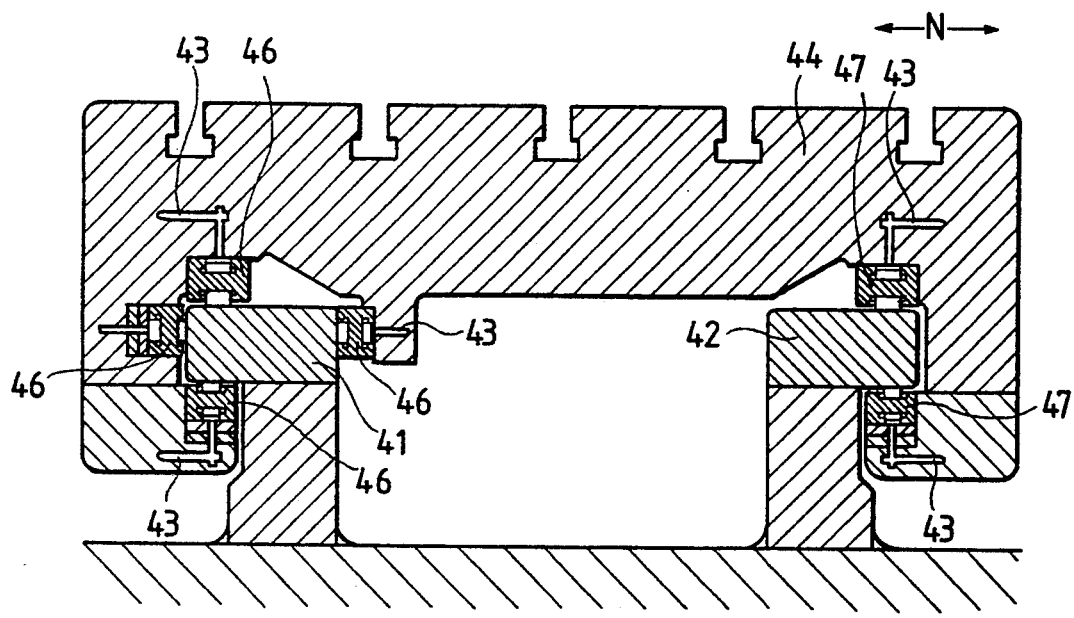
FIG. 13 is a cross section of another example of conventional linear motion rolling guide units.

Now, by referring to the accompanying drawings, embodiments of the linear motion rolling guide unit of this invention will be described. In FIG. 1 and FIG. 2, parts identical with the corresponding parts in FIG. 12 are given like reference numerals.

The linear motion rolling guide unit (simply referred to as a guide unit) shown in FIG. 1 consists of two track rails 2 (simply referred to as rails) laid parallel to each other on a bed, a plurality of sliders 1 mounted astride each rail 2 and a slide table (see reference numeral 4 in FIG. 12) secured to the sliders 1. Equipment placed on the slide table is moved forward and backward as shown in FIG. 12. The rail 2 has raceway grooves 5 formed in its longitudinally-extending side walls 21. The slider 1 is slidably mounted astride the rails 2. The slider 1 has a casing 3 and end caps 6 fixed to the longitudinal ends of the casing 3. The casing 3 and the end caps 6 have their bottoms recessed to form rail accommodating recesses 10 so that they can slide on the rail 2.

The slider 1 has the casing 3 which is slidable relative to the rails 2 and which has raceway grooves 9 formed in positions facing the raceway grooves 5, a number of rolling elements 7 of balls that are confined between the opposing raceway grooves 5 and 9 to allow relative motion between the casing and the rail, an underside sealing member 8 that provides a seal between the rail 2 and the casing 3, and the end caps 6 attached to the longitudinal ends of the casing 3, the longitudinal direction being the same as the direction of the slide of the casing. The casing 3 consists of side parts 25 facing the side surfaces of the rails 2 and formed with raceway grooves 9, and an upper part 24 which is formed integral with the side parts 25 and to which the slide table 5 is fixed. To prevent the rolling elements 7 from coming off the casing 3, a ball retaining band 18 is fitted into the casing 3 so as to enclose the rolling elements 7.

The end cap 6, as shown in FIG. 2, is provided with a side sealing member 17 that provides the sealing between the rail 2 and the slider 1. The end cap 6 also has a grease nipple 22 for supplying lubricant to the sliding surface between the rail 2 and the slider 1. The end caps 6 are secured to the end surfaces of the casing 3 by screws inserted into the mounting holes 31. The end cap 6 is formed with a rail accommodating recess 28 at the bottom through which the rail 2 is passed. The end cap 6 also has a raceway groove 19 and a direction changing path 11 formed on each side. The raceway groove 19 together with the rail 2 forms the sliding surface for the rolling elements 7, and the direction changing path 11 is designed to change the direction of travel of the rolling elements 7 for circulating them.

With the slider 1 mounted astride the rail 2, the guide unit of the above construction can freely slide on the rails by the action of the rolling elements 7 which turn and circulate in the raceway grooves 5 of the rails 2. The rolling elements 7 traveling under load in the raceway grooves 5 of the rails 2 are, as shown in FIG. 2, introduced into the direction changing paths 11 formed in the end caps 6 and then into the return paths 13 formed parallel to the raceway grooves 9 in the upper part of the casing 3. In this way, the rolling elements 7 circulate in endless circulation passages. By the turning action of the rolling elements 7 under load situated between the raceway grooves 9 of the slider 1 and the raceway grooves 5 of the rails 2, the slider 1 and the rails 2 can perform relative sliding motions freely.

Next, by referring to FIG. 3 to FIG. 7, the basic concept of the linear motion rolling guide unit of this invention will be explained. Parts identical with the corresponding parts in FIG. 1 are denoted by like reference numerals.

Figure 3:
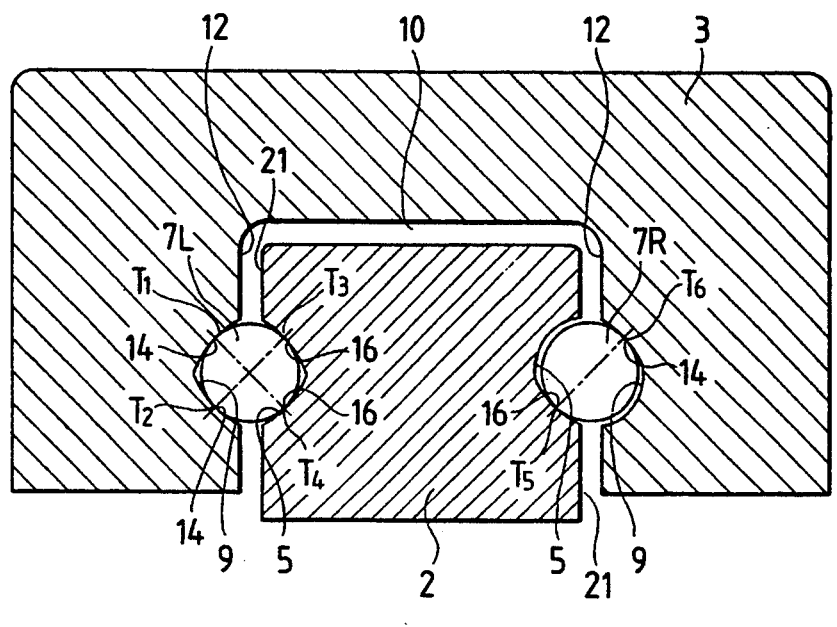
FIG. 3 is a cross section showing the relationship between the casing, the track rail and the rolling elements and for explaining the basic principle of the linear motion rolling guide unit according to this invention.
Figure 4:
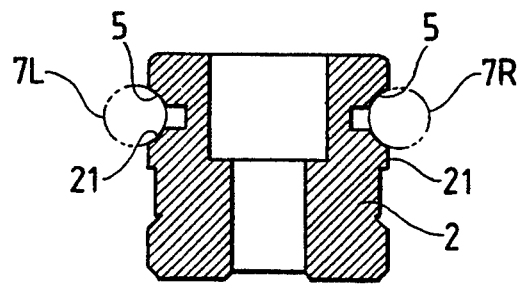
FIG. 4 is a cross section of an example of the track rail.
Figure 5:
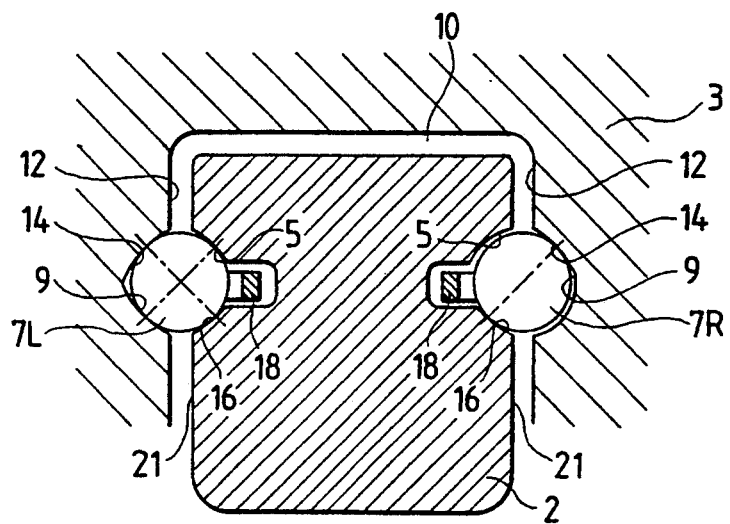
FIG. 5 is a cross section showing the relationship between the casing, the track rail and the rolling elements of the linear motion rolling guide unit of an embodiment of this invention.

As shown in FIG. 3, the guide unit consists of rails 2 (FIG. 4) each of which has two rail raceway grooves 5 formed on the longitudinally extending side walls 21, casings 3 (FIG. 5), each of which is mounted astride one of the rails 2 and slidably relative to the rail 2 and has casing raceway grooves 9 so formed as to face the rail raceway grooves 5, two rows of rolling elements 7 that travel through raceways formed by the rail raceway grooves 5 and the casing raceway grooves 9 to permit relative motion between the rail and the casings, and end caps 6 (FIG. 2) attached to the longitudinal ends of the casing 3 and each of which has direction changing paths 11 (FIG. 2) to circulate the rolling elements 7.

Figure 6:
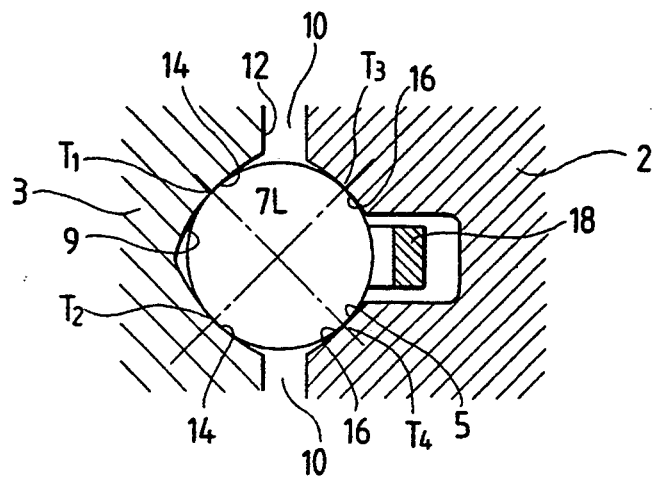
FIG. 6 is a cross section showing the rolling element of FIG. 5 in a four-point contact state.
Figure 7:
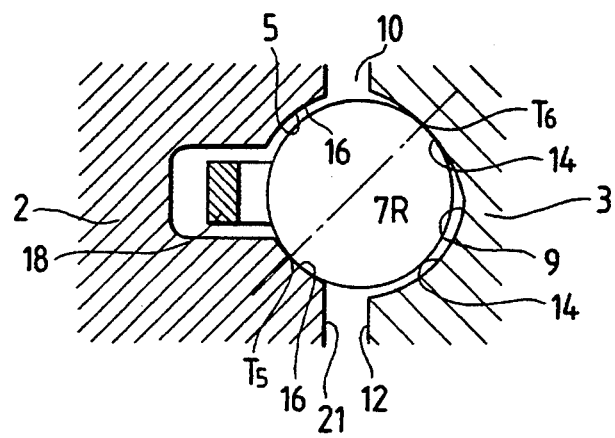
FIG. 7 is a cross section showing the rolling element of FIG. 5 in a two-point contact state.

As shown in FIG. 6 and 7, the rail raceway groove 5, which is formed in the longitudinally extending side walls 21 of the rail 2, has two raceway surfaces 16. The casing raceway groove 9, which is formed in the inner side walls 12 of the rail accommodating recess 10, has two raceway surfaces 14. In the guide unit, as shown in FIG. 6, the rolling elements 7L traveling in one of the raceways (the left-hand side raceway is shown) are in two-point contact (at $T_3$ and $T_4$) with the raceway surfaces 16 of the rail raceway groove 5 and at the same time are in two-point contact (at $T_1$ and $T_2$) with the raceway surfaces 14 of the casing raceway groove 9.

This guide unit has another feature. As shown in FIG. 7, the rolling elements 7R traveling in the other raceway (the right-hand side raceway is shown) are in one-point contact (at $T_5$) with the lower raceway surface 16 of the rail raceway groove 5 and at the same time are in one-point contact (at $T_6$) with the upper raceway surface 14 of the casing raceway groove 9. In other words, the rolling elements 7R move in the second raceway (the right-hand side raceway is shown) while remaining out of contact with the upper raceway surface 16 of the rail raceway groove 5 and with the lower raceway surface 14 of the casing raceway groove 9.

The linear motion rolling guide unit of this invention is applied in ways as shown in FIG. 8 to FIG. 11. In these figures, parts identical with those of FIG. 3 and FIG. 12 are designated by like reference numerals.

Figure 8:
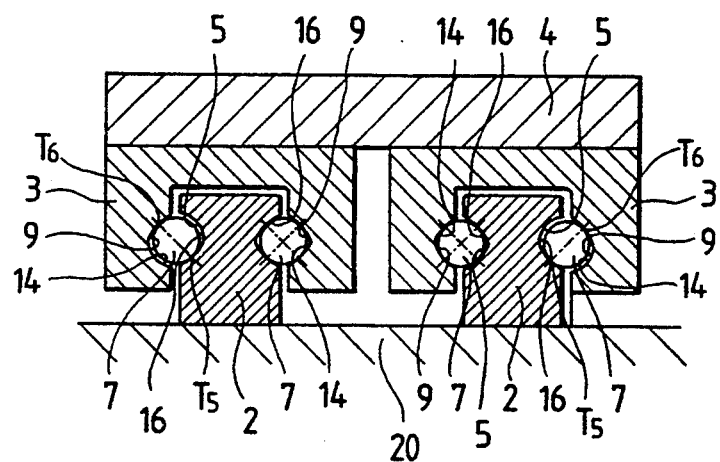
FIG. 8 is a cross section of one embodiment of the linear motion rolling guide unit according to this invention.

Another embodiment of the linear motion rolling guide unit will be described by referring to FIG. 8. As shown in the figure, the guide unit has two rails 2 laid parallel to each other on a bed 20. The rolling elements 7 traveling in one of the two raceways contact at two points with the rail raceway groove 5 and with the casing raceway groove 9. The rolling elements 7 rolling in the other raceway are in one-point contact with the rail raceway groove 5 and with the casing raceway groove 9. A slide table 4 is securely mounted on the casings 3, each of which saddles one of the two parallel rails 2. On the two facing inner raceways of the parallel rails 2, the rolling elements 7 contact at four points ($T_1$, $T_2$, $T_3$, $T_4$) with the two inner raceways of the right and left rails 2, and the rolling elements 7 contact at two points ($T_5$, $T_6$) with the two outer raceways of the two rails 2. In the outer rail raceway grooves 5, the rolling elements 7 contact the lower raceway surface 16 (at $T_5$) and, in the outer casing raceway grooves 9, contact the upper raceway surface 14 (at $T_6$). Hence, in this guide unit the two inner raceways are the reference for the sliding motion and the slider 1 is allowed to move slightly outwardly in a direction perpendicular to the sliding direction of the slide table 4, and has a center adjustment function that tolerates some degree of the machining accuracy. The amount of this adjustment is small considering the moment of load acting on the slide table 4 because the rolling elements 7 contact the upper raceway surface 14 of the outer casing raceway groove 9 (at $T_6$).

Figure 9:
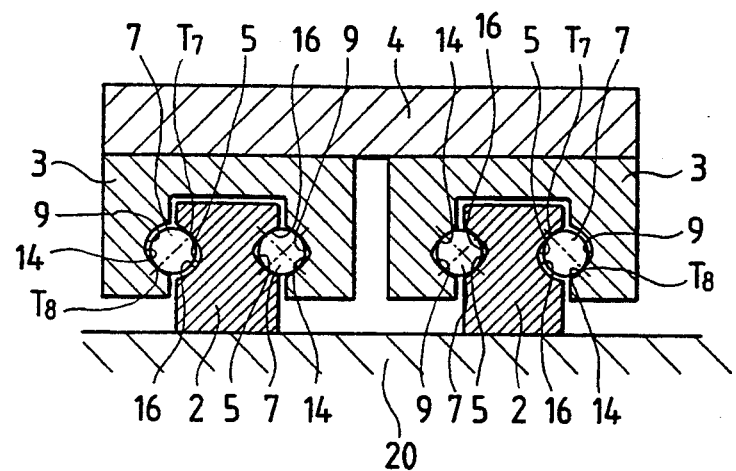
FIG. 9 is a cross section of another embodiment of the linear motion rolling guide unit according to this invention.

A further embodiment of the linear motion rolling guide unit will be described by referring to FIG. 9. As shown in the figure, the guide unit consists of two parallel rails 2, casings 3 mounted astride each of the rails, and a slide table 4 secured to the casings 3. In two inner raceways formed on the facing sides of the two rails 2, the rolling elements 7 are in four-point contact with the raceway surface (at $T_1$, $T_2$, $T_3$, $T_4$). In two outer raceways formed on the outer sides of the two rails 2, the rolling elements 7 are in two-point contact with the raceway surfaces (at $T_7$, $T_8$). In the outer rail raceway groove 5, the rolling elements 7 contact the upper raceway surface 16 (at $T_7$) and, in the outer casing raceway groove 9, the lower raceway surface 14 (at $T_8$). Hence, in this guide unit the two inner raceways serve as the reference of the sliding motion and the slider 1 is allowed to move slightly outwardly in a direction perpendicular to the sliding direction of the slide table 4, and has a center adjustment function that tolerates some degree of machining accuracy. The amount of this adjustment is large considering the moment of load acting on the slide table 4 because the rolling elements 7 contact the lower raceway surface 14 of the outer casing raceway groove 9 (at $T_8$).

Figure 10:
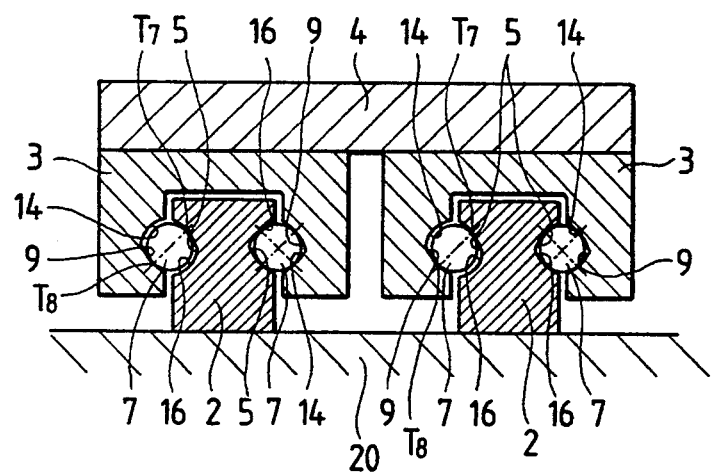
FIG. 10 is a cross section of a further another embodiment of the linear motion rolling guide unit according to this invention.

A further another embodiment of the linear motion rolling guide unit will be explained by referring to FIG. 10. As shown in the figure, the guide unit has two rails 2 laid parallel to each other on a bed 20. The rolling elements 7 traveling in one of the two raceways are in two-point contact with the rail raceway groove 5 (at $T_3$, $T_4$) and with the casing raceway groove 9 (at $T_1$, $T_2$). The rolling elements 7 moving in the other raceway are in one-point contact with the rail raceway groove 5 (at $T_7$) and with the casing raceway groove 9 (at $T_8$). A slide table 4 is securely mounted on the casings 3, each of which saddles one of the two parallel rails 2. In one of the inner raceways the rolling elements 7 are in four-point contact with the raceway surfaces (at $T_1$, $T_2$, $T_3$, $T_4$). In the other inner raceway the rolling elements 7 are in two-point contact with the raceway surfaces (at $T_7$, $T_8$). In one of the outer raceways the rolling elements 7 are in two-point contact with the raceway surfaces (at $T_7$, $T_8$). In the other outer raceway the rolling elements 7 are in four-point contact with the raceway surfaces (at $T_1$, $T_2$, $T_3$, $T_4$). The two-point contact ($T_7$, $T_8$) is such that the rolling elements 7 contact the lower raceway surface 14 of the casing raceway groove 9 (at $T_8$) and contact the upper raceway surface 16 of the rail raceway groove 5 (at $T_7$). Hence, in this guide unit the raceways on the right-hand side of the rails 2 are the reference of the sliding motion. The guide unit with the above construction has a function of adjusting parallelism errors due to machining errors and setting errors. The amount of adjustment is such that the rigidity of the unit is small against an external force acting from the left side in the figure and large against a force from the right side. This guide unit has the two raceways on the right side serve as the reference of the sliding motion and allows the slider 1 to slightly move toward left perpendicular to the sliding direction of the slide table 4 so as to adjust and absorb machining errors. The amount of this adjustment is large considering the moment of load acting on the slide table 4 because the rolling elements 7 contact the lower raceway surface 14 of the outer casing raceway groove 9 (at $T_8$).

Figure 11:
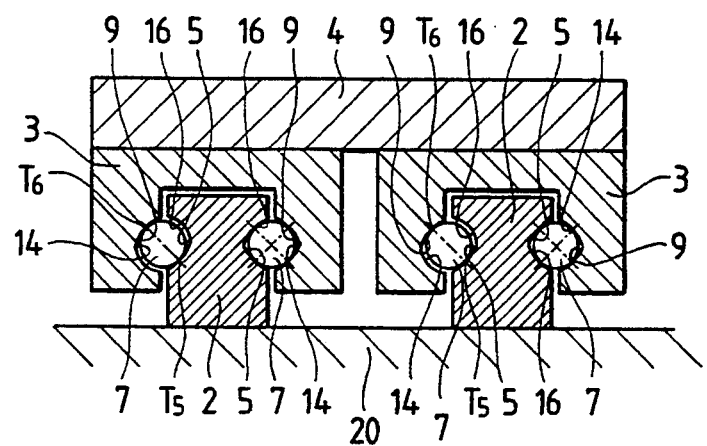
FIG. 11 is a cross section of a still another embodiment of the linear motion rolling guide unit according to this invention.

A still another embodiment of the linear motion rolling guide unit will be explained by referring to FIG. 11. As shown in the figure, the guide unit has two rails 2 laid parallel to each other on a bed 20. The rolling elements 7 traveling in one of the two raceways are in two-point contact with the rail raceway groove 5 (at $T_3$, $T_4$) and with the casing raceway groove 9 (at $T_1$, $T_2$). The rolling elements 7 moving in the other raceway are in one-point contact with the rail raceway groove 5 (at $T_5$) and with the casing raceway groove 9 (at $T_6$). A slide table 4 is securely mounted on the casings 3, each of which saddles one of the two parallel rails 2. In one of the inner raceways the rolling elements 7 are in four-point contact with the raceway surfaces (at $T_1$, $T_2$, $T_3$, $T_4$). In the other inner raceway the rolling elements 7 are in two-point contact with the raceway surfaces (at $T_5$, $T_6$). In one of the outer raceways the rolling elements 7 are in two-point contact with the raceway surfaces (at $T_5$, $T_6$). In the other outer raceway the rolling elements 7 make a four-point contact with the raceway surfaces (at $T_1$, $T_2$, $T_3$, $T_4$). The two-point contact ($T_5$, $T_6$) is such that the rolling elements 7 contact the upper raceway surface 14 of the casing raceway groove 9 (at $T_6$) and contact the lower raceway surface 16 of the rail raceway groove 5 (at $T_5$). Hence, in this guide unit the raceways on the right-hand side of the rails 2 are the reference of the sliding motion. The guide unit with the above construction has a function of adjusting parallelism errors due to machining errors and setting errors. The amount of adjustment is such that the rigidity of the unit is small against an external force acting from the left side in the figure and large against a force from the right side. This guide unit has the two raceways on the right side serve as the reference of the sliding motion and allows the slider 1 to slightly move toward left perpendicular to the sliding direction of the slide table 4 so as to adjust and absorb machining errors. The amount of this adjustment is small considering the moment of load acting on the slide table 4 because the rolling elements 7 contact the upper raceway surface 14 of the outer casing raceway groove 9 (at $T_6$).

I claim:

1. A linear motion guide unit comprising:
a base;
a track rail mounted on the base and having rail raceway grooves formed in each of side surfaces thereof, each of the rail raceway grooves having longitudinally extending upper and lower raceway surfaces;
a casing saddling the track rail, capable of sliding relatively to and in the longitudinal direction of the track rail, and having casing raceway grooves in positions facing the rail raceway grooves, each of the casing raceway grooves having upper and lower raceway surfaces;
first and second tracks formed by the rail raceway grooves and the casing raceway grooves opposed to the rail raceway grooves, extending in two rows and in parallel with each other on both sides of the track rail,
a number of rolling elements rolling on said first and second tracks in such a manner that the casing can be moved relatively to the track rail; and
end caps attached to longitudinal ends of the casing;
the rolling elements moving on the first track being in two point contact with each of the raceway surfaces of the rail raceway groove and with each of the raceway surfaces of the casing raceway groove opposed to the rail raceway groove so that they are totally in four point contacting state;
the rolling elements moving on the second track being in one point contact with one of the raceway surfaces of the rail raceway groove and with one of the raceway surfaces of the casing raceway groove opposed to the rail raceway groove so that they are totally in two-point contacting state;
the first track with which the rolling elements are in four point contact being determined as a reference track, a lateral movement of the casing being rendered possible on the second track with which the rolling elements are in two point contact, thereby tolerating machining errors of the raceway surfaces and an uneven load which works on the casing, and ensuring smooth sliding of the casing along the track rail.

2. A linear motion guide unit comprising:
a base;
a pair of track rails laid parallel to each other on the base and each having rail raceway grooves in both sides surfaces thereof, each of the rail raceway grooves having longitudinally extending upper and lower raceway surfaces;

a pair of casing saddling the track rails respectively and capable of sliding relatively to an in the longitudinal direction of the track rails, each of the casings having casing raceway grooves in positions opposed to the rail raceway grooves, the casing raceway grooves having respective upper and lower raceway surfaces;

first and second tracks formed by the rail raceway grooves and the casing raceway grooves opposed to the rail raceway grooves, said first and second tracks extending in two rows and in parallel with each other on both sides of each of said pair of track rails;

a number of rolling elements rolling on said first and second tracks in such a manner that the casings can be moved relatively to the track rails;

end caps attached to longitudinal ends of each casing; and a slide table secured astride the pair of casings, the rolling elements on each of the first tracks are in two point contact with each of the raceway surfaces of the rail raceway groove and of the corresponding casing raceway groove, whereby the rolling elements on the first tracks are totally in four point contacting state;

the rolling elements being in one point contact with either the upper or lower raceway surface alone of the rail raceway groove, the rolling elements being in one point contact with the lower raceway surface alone of the casing raceway groove when the rolling elements have come into one point contact with the upper raceway surface of the rail raceway groove, the rolling elements being in one point contact with the upper raceway surface alone of the casing raceway groove when the rolling elements come into one point contact with the lower raceway surface of the rail raceway groove, whereby the rolling elements on the second tracks are totally in two point contacting state;

the first tracks with which the rolling elements are four point contact being determined as reference tracks, lateral movements of the slide table being made possible on the second tracks with which the rolling elements are in two point contact, thereby leaving a margin for machining precision by tolerating machining errors of the raceway surfaces, and also permitting the slide table to slide smoothly on the track rails even when uneven load works on the casings.

3. A linear motion rolling guide unit as claimed in claim 2, wherein at least two casings are mounted on each of the track rails and are secured to the slide table.

4. A linear motion rolling guide unit as claimed in claim 2, wherein the casings each comprises side portions which face the sides of the track rail and are formed with the casing raceway grooves, and an integral upper portion to which the slide table is secured.

5. A linear motion guide unit according to claim 2, wherein each of the first tracks consists of the track on the mutually opposed side of each of the track rails, each of the second tracks consisting of the track on the side of each of the track rails which is opposite to the mutually opposed side thereof.

6. A linear motion guide unit according to claim 2, wherein each of the first tracks consists of the track on a same side of each of the track rails, each of the second tracks consisting of the track on an opposite side of said each of the track rails.

* * * * *